United States Patent
Hsu

(10) Patent No.: US 11,422,645 B2
(45) Date of Patent: Aug. 23, 2022

(54) WIRELESS INPUT COMPONENT AND OPERATION METHOD THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventor: Chung-Wen Hsu, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 137 days.

(21) Appl. No.: 17/025,956

(22) Filed: Sep. 18, 2020

(65) Prior Publication Data

US 2021/0089143 A1    Mar. 25, 2021

Related U.S. Application Data

(60) Provisional application No. 62/902,988, filed on Sep. 20, 2019.

(30) Foreign Application Priority Data

Sep. 8, 2020   (CN) .......................... 202010935562.0

(51) Int. Cl.
*G06F 3/038*   (2013.01)
*A63F 13/79*   (2014.01)
(Continued)

(52) U.S. Cl.
CPC ............ *G06F 3/0383* (2013.01); *A63F 13/79* (2014.09); *G06F 3/03543* (2013.01);
(Continued)

(58) Field of Classification Search
CPC .. G06F 3/03543; G06F 3/0383; G06F 13/102; G06F 21/32; G06F 2203/0384;
(Continued)

(56) References Cited

U.S. PATENT DOCUMENTS

2008/0311765 A1* 12/2008 Chatterjee ............... G06F 3/038
                                                                439/38
2021/0278911 A1*  9/2021 Lu ........................... H04W 4/80

FOREIGN PATENT DOCUMENTS

CN         105138151 A      12/2015
CN         108268149 A       7/2018

OTHER PUBLICATIONS

Communication corresponding to Chinese Application No. 202010935562.0 and issued by the China National Intellectual Property Administration dated Apr. 28, 2021, 9 pages.

* cited by examiner

Primary Examiner — Koosha Sharifi-Tafreshi
(74) Attorney, Agent, or Firm — Innovation Counsel LLP

(57) ABSTRACT

A wireless input component and an operation method thereof are provided. The wireless input component includes a wireless reception device and a peripheral input device. The wireless reception device includes a connection interface, a storage device and a processor. The connection interface is connected to a first host. The storage device is configured to record operation parameter information of the first host. The processor connects the connection interface and the storage device and is configured to control the storage device. The communication device connects the processor. The peripheral input device includes an input device and a transmission device. The input device is configured to generate an input signal. The transmission device connects the input device and is connected to the communication device through a wireless communication
(Continued)

path and configured to transmit the input signal to the communication device of the wireless reception device.

15 Claims, 13 Drawing Sheets

(51) Int. Cl.
    *G06F 3/0354*     (2013.01)
    *G06F 13/10*     (2006.01)
    *G06F 21/32*     (2013.01)
    *G06V 40/12*     (2022.01)

(52) U.S. Cl.
    CPC ............ *G06F 13/102* (2013.01); *G06F 21/32* (2013.01); *G06V 40/12* (2022.01); *G06F 2203/0384* (2013.01)

(58) Field of Classification Search
    CPC .. G06F 2203/0336; G06F 3/033; G06F 3/038; G06F 3/039; A63F 13/79; A63F 13/20; G06V 40/12; G05B 19/0423; G05B 2219/23051
    USPC .......................................................... 345/163
    See application file for complete search history.

WIRELESS INPUT COMPONENT AND OPERATION METHOD THEREOF

This application claims the benefit of U.S. provisional application Ser. No. 62/902,988, filed Sep. 20, 2019, and People's Republic of China application Serial No. 202010935562.0, filed Sep. 8, 2020, the subject matter of which is incorporated herein by reference.

BACKGROUND OF THE INVENTION

Field of the Invention

The invention relates in general to an electronic device and an operation method thereof, and more particularly to a wireless input component and an operation method thereof.

Description of the Related Art

Along with the rapid development in the gaming industry, various complicated games are provided one after another. In some games, suitable hardware and software parameters must be set on the host for the games to run smoothly.

Besides, the user may need to make finetuning on some parameters to suit personal hand sensitivity and operation habit. Particularly, during the competition of electronic sports, these parameters are crucial to the players and very often are the key to victory.

Therefore, it has long been the players' wish that the industries can develop a product capable of recording game parameters. Furthermore, to well protect the players' technical know-how, the game parameters need to be secured and be exclusive to the players.

SUMMARY OF THE INVENTION

The invention is directed to a wireless input component and an operation method thereof. The operation parameter information is recorded in the wireless reception device instead of being stored to the host, such that the wireless reception device can be used as authentication. After the user plugs the wireless reception device into another host, the host and the peripheral input device can be set by the original operation parameter information. Furthermore, the wireless reception device and the peripheral input device can be verified using pairing technology, fingerprint recognition, or NFC technology to assure the safety of the operation parameter information.

According to one embodiment of the present invention, a wireless input component is provided. The wireless input component includes a wireless reception device and a peripheral input device. The wireless reception device includes a connection interface, a storage device and a processor. The connection interface is connected to a host. The storage device is configured to record operation parameter information of the host. The processor connects the connection interface and the storage device and is configured to control the storage device. The communication device connects the processor. The peripheral input device includes an input device and a transmission device. The input device is configured to generate an input signal. The transmission device connects the input device and is connected to the communication device through a wireless communication path and configured to transmit the input signal to the communication device of the wireless reception device.

According to another embodiment of the present invention, an operation method of a wireless input component is provided. The wireless input component includes a wireless reception device and a peripheral input device. The peripheral input device is connected to the wireless reception device through a wireless communication path. The operation method of a wireless input component includes the following steps. If a connection interface of the wireless reception device is connected to a host, then the wireless reception device and the peripheral input device are paired. A storage device is controlled by a processor of the wireless reception device to record operation parameter information of the host, wherein the processor connects the connection interface.

The wireless input component and the operation method thereof disclosed in the present invention have the following effects. The operation parameter information is recorded in a wireless reception device instead of being stored in a first host, such that the wireless reception device can be used as authentication. When the user plugs the wireless reception device into second host, the second host and its peripheral input device can immediately be set by the original operation parameter information. Furthermore, the wireless reception device and the peripheral input device can be verified using pairing authentication, fingerprint recognition, or NFC technology to assure the safety of accessing the operation parameter information.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
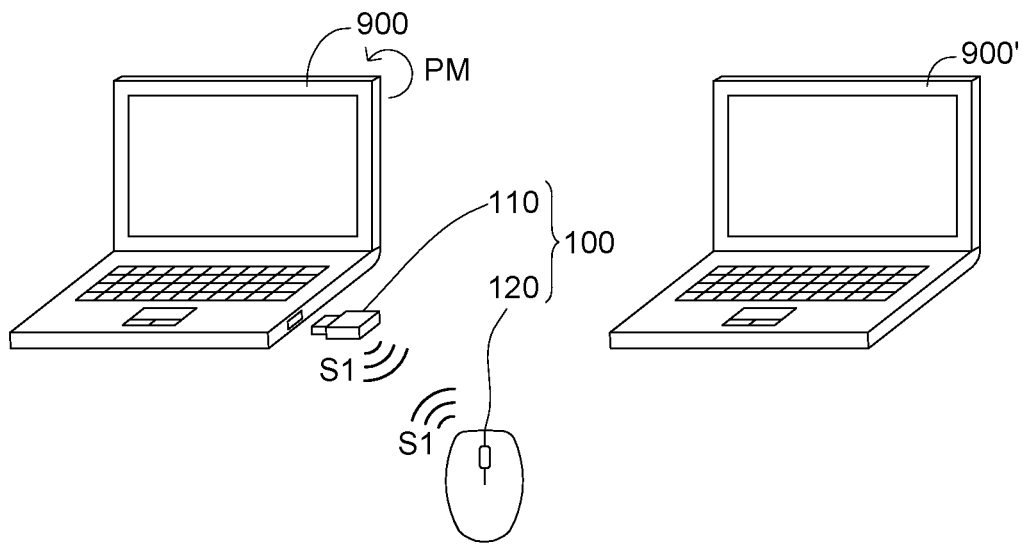
FIG. 1 is a schematic diagram of hosts and a wireless input component according to an embodiment.

Referring to FIG. 1, a schematic diagram of hosts 900 and 900' and a wireless input component 100 according to an embodiment is shown. Each of the hosts 900 and 900' can be realized by a desktop computer, a laptop computer or a PC tablet. The wireless input component 100 includes a wireless reception device (e.g., dongle) 110 and a peripheral input device 120. The wireless reception device 110 could be plugged into a port of the host 900. The peripheral input device 120 can be realized by a wireless mouse, a wireless keyboard, a wireless joystick or a wireless writing board. The wireless reception device 110 and the peripheral input device 120 are paired, such that an input signal S1 of the peripheral input device 120 can be transmitted to the wireless reception device 110 to perform corresponding operations to the host 900.

When the user plays games, suitable operation parameter information PM needs to be set on the host 900 to run the games effectually and smoothly. The operation parameter information PM includes hardware and software parameters, such as a system temperature controlling parameter, a keyswitch setting parameter, a mouse sensitivity parameter, a display setting parameter, a rated voltage parameter, or a rated power parameter. The keyswitch setting parameter, for example, can set the "W", "X", "A", "D" keys of the keyboard as "up", "down", "left", "right" keys. The mouse sensitivity parameter could adjust the cursor moving speed or double click speed.

In the present embodiment, the operation parameter information PM can be recorded in the wireless reception device 110 with authentication. After the user plugs the wireless reception device 110 into another host 900', the host 900' and the peripheral input device 120 can be set by the original operation parameter information PM.

Figure 2:
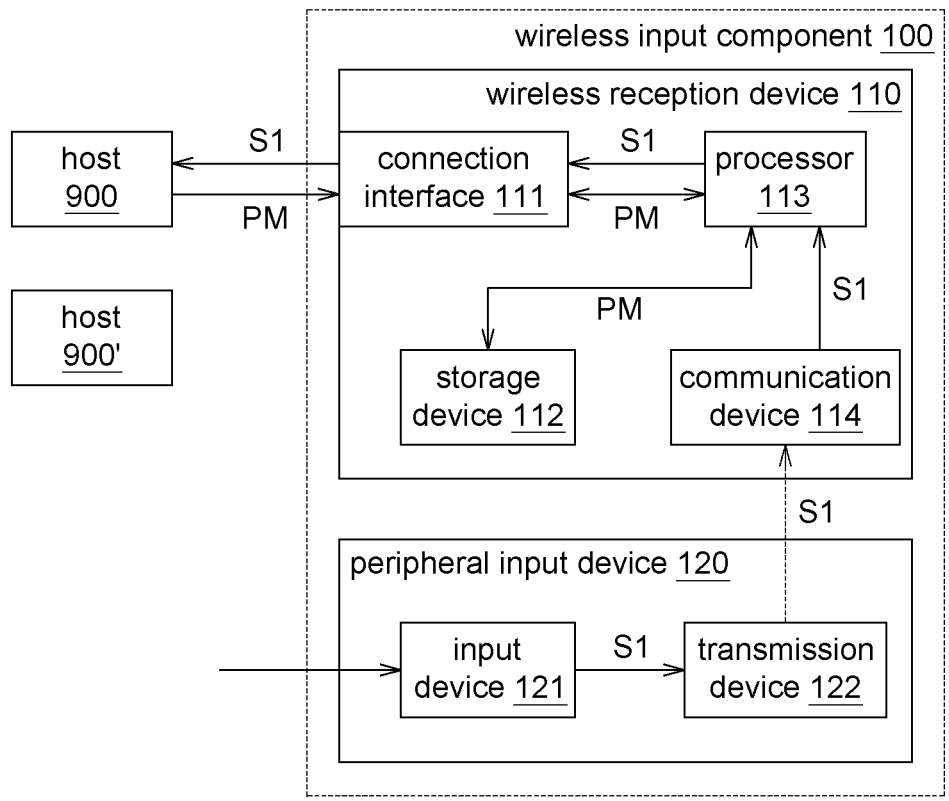
FIG. 2 is a block diagram of the hosts and the wireless input component according to an embodiment.

Referring to FIG. 2, a block diagram of the hosts 900 and 900' and the wireless input component 100 according to an embodiment is shown. The wireless reception device 110 of the wireless input component 100 includes a connection interface 111, a storage device 112, a processor 113 and a communication device 114. The connection interface 111 is configured to connect to the host 900. The connection interface 111 can be realized by a micro USB port or a type C USB port. The storage device 112, which can be realized by a non-volatile memory, is configured to record the operation parameter information PM of the host 900. The processor 113, which can be realized by a chip, a circuit or a storage device storing a programming code, connects the connection interface 111 and the storage device 112, and is configured to control the storage device 112. The communication device 114 connects the processor 113. The communication device 114, which can be realized by an antenna module, is configured to communicate with the peripheral input device 120.

The peripheral input device 120 includes an input device 121 and a transmission device 122. The input device 121, which can be realized by the keys of a keyboard and the left key, the right key, the roller or the optical detector of a mouse, is configured to generate the input signal S1. The transmission device 122, which can be realized by an antenna module, connects the input device 121, and is connected to the communication device 114 through a wireless communication path and configured to transmit the input signal S1 to the communication device 114 of the wireless reception device 110.

Through the design of the wireless reception device 110, the operation parameter information PM can be recorded in the storage device 112 of the wireless reception device 110, such that the wireless reception device 110 can be used as authentication. After the user plugs the wireless reception device 110 into another host 900', the host 900' and the peripheral input device 120 can be set by the original operation parameter information PM. Operations of each of the above elements are further described below with a flowchart.

Figure 3A:
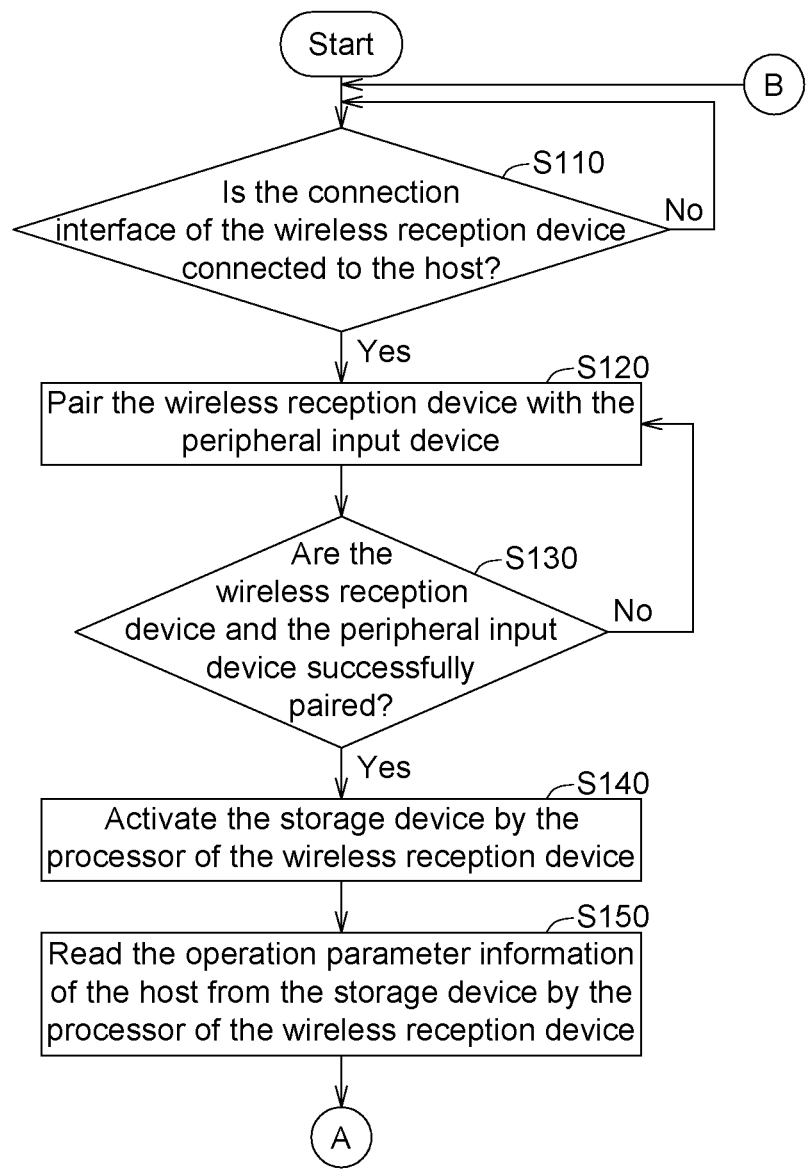
FIGS. 3A to 3B show a flowchart of an operation method of the wireless input component according to an embodiment.
Figure 3B:
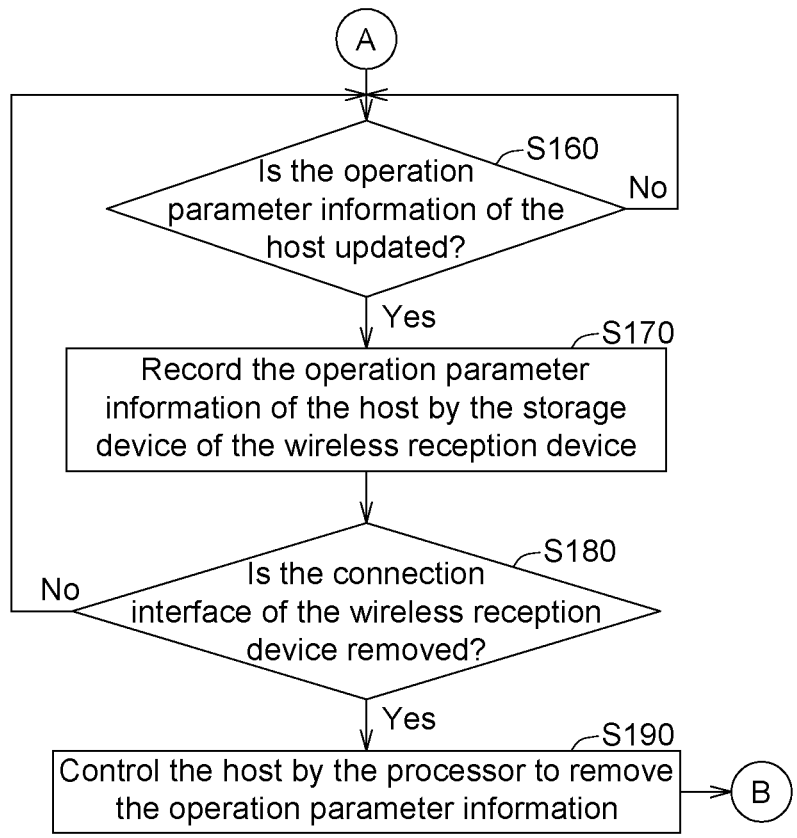

Refer to FIG. 2 and FIGS. 3A to 3B. FIGS. 3A to 3B show a flowchart of an operation method of the wireless input component 100 according to an embodiment. In step S110, whether the connection interface 111 of the wireless reception device 110 is connected to the host 900 is determined. If the connection interface 111 of the wireless reception device 110 is already connected to the host 900, then the method proceeds to step S120; if the connection interface 111 of the wireless reception device 110 is not yet connected to the host 900, then the method returns to step S110. After the connection interface 111 of the wireless reception device 110 is connected to the host 900, the wireless reception device 110 is powered by the host 900.

In step S120, the wireless reception device 110 and the peripheral input device 120 are paired. In an embodiment, the wireless reception device 110 and the peripheral input device 120 are paired using a 2.4G signal. The wireless reception device 110 and the peripheral input device 120 have a one-to-one pairing relation. That is, the peripheral input device 120 and the wireless reception device 110 can be paired successfully only with each other. If the user wants to use the peripheral input device 120, the wireless reception device 110 must be provided. Thus, the wireless reception device 110 is virtually a pairing lock to the peripheral input device 120. In another embodiment, the wireless reception device 110 and the peripheral input device 120 can also be paired using a 5G signal, a radio frequency signal or a Bluetooth signal.

In step S130, whether the wireless reception device 110 and the peripheral input device 120 are successfully paired is determined. If the wireless reception device 110 and the peripheral input device 120 are successfully paired, then the method proceeds to step S140; if the wireless reception device 110 and the peripheral input device 120 are not successfully paired, then the method returns to step S120.

In step S140, the storage device 112 is activated by the processor 113 of the wireless reception device 110. Once the storage device 112 is activated, data can be read from or written to the storage device 112. That is, the condition for the activation of the storage device 112 of the present embodiment is that the wireless reception device 110 and the peripheral input device 120 must successfully paired. If the wireless reception device 110 and the peripheral input device 120 cannot be successfully paired, then the storage device 112 will not be activated.

In another embodiment, steps S120 and S130 can be omitted, and the processor 113 directly activates the storage device 112 when the wireless reception device 110 is electrified.

In step S150, the operation parameter information PM of the host 900 is read from the storage device 112 by the processor 113 of the wireless reception device 110, such that the operation parameter information PM can be transmitted to the host 900 to perform corresponding setting.

In step S160, whether the operation parameter information PM of the host 900 is updated is determined by the processor 113 of the wireless reception device 110. If the operation parameter information PM is updated, then the method proceeds to step S170; if the operation parameter information PM is not updated, then the method returns to step S160.

In step S170, the operation parameter information PM of the host 900 is recorded by the storage device 112 of the wireless reception device 110. Given that the operation parameter information PM is updated, the storage device 112 will record the operation parameter information PM of the host 900, such that the storage device 112 of the wireless reception device 110 can always store the most updated operation parameter information PM.

In step S180, whether the connection interface 111 of the wireless reception device 110 is removed is determined by the host 900. If the connection interface 111 of the wireless reception device 110 is already removed, then the method proceeds to step S190; if the connection interface 111 of the wireless reception device 110 is not yet removed, then the method returns to step S160.

In step S190, the host 900 is controlled by the processor 113 to remove the operation parameter information PM. Thus, given that the wireless reception device 110 is already removed, the operation parameter information PM is stored in the wireless reception device 110 only. Since only the user owning the wireless reception device 110 can set the host 900 using the operation parameter information PM, the wireless reception device 110 can be used as authentication.

Figure 4:
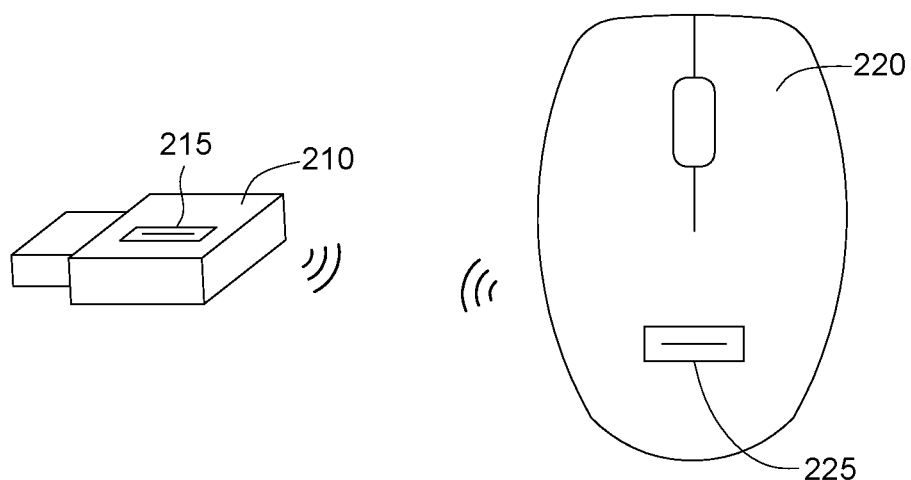
FIG. 4 is a schematic diagram of a wireless input component according to another embodiment.
Figure 5:
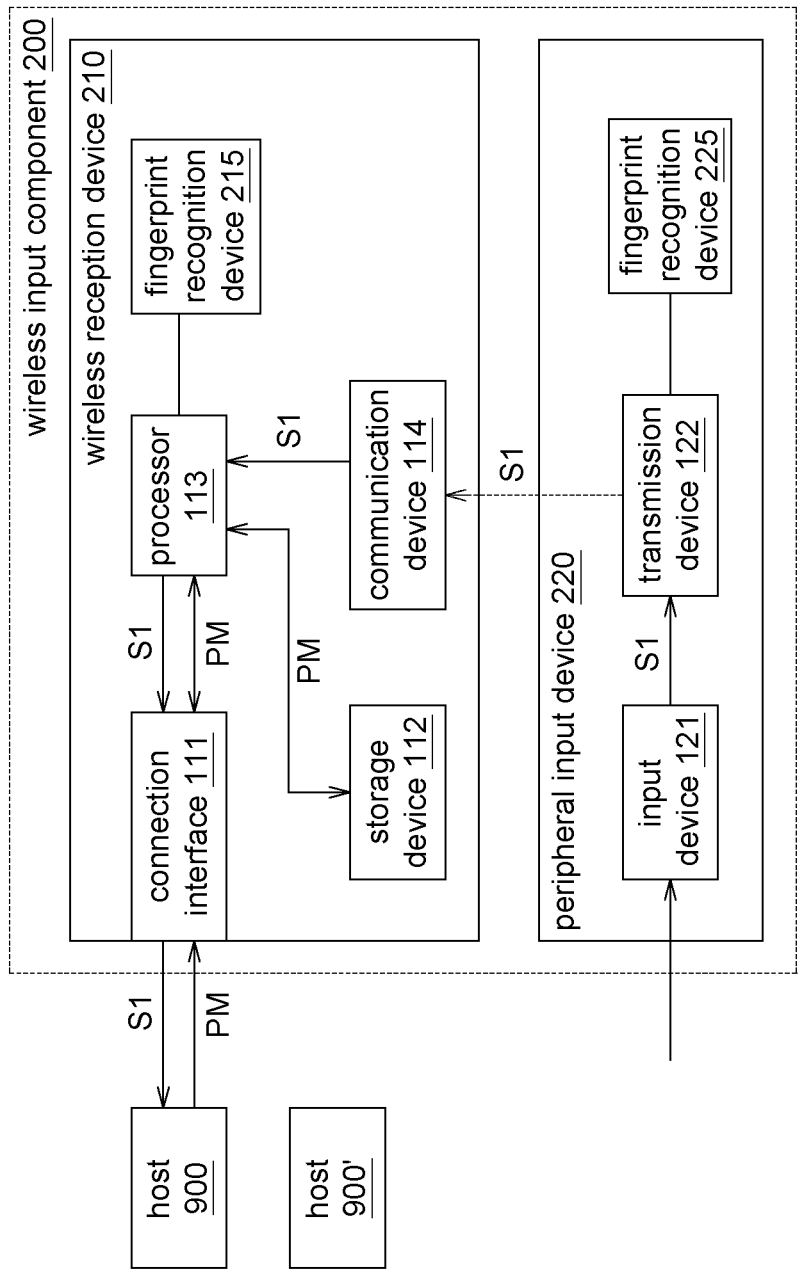
FIG. 5 is a block diagram of the wireless input component according to another embodiment.

Refer to FIGS. 4 to 5. FIG. 4 is a schematic diagram of a wireless input component 200 according to another embodiment. FIG. 5 is a block diagram of the wireless input component 200 according to another embodiment. In another embodiment, the wireless reception device 210 of the wireless input component 200 further includes a fingerprint recognition device 215; the peripheral input device 220 further includes a fingerprint recognition device 225. The fingerprint recognition device 215 connects the processor 113. The fingerprint recognition device 225 is connected to the processor 113 through the wireless communication path. Both the fingerprint recognition device 215 and the fingerprint recognition device 225 are configured to verify a fingerprint of the user. The fingerprint recognition device 215 and the fingerprint recognition device 225 can reinforce the safety of the wireless input component 200 to avoid any unauthorized person stealing the wireless input component 200 and using the operation parameter information PM.

Figure 6A:
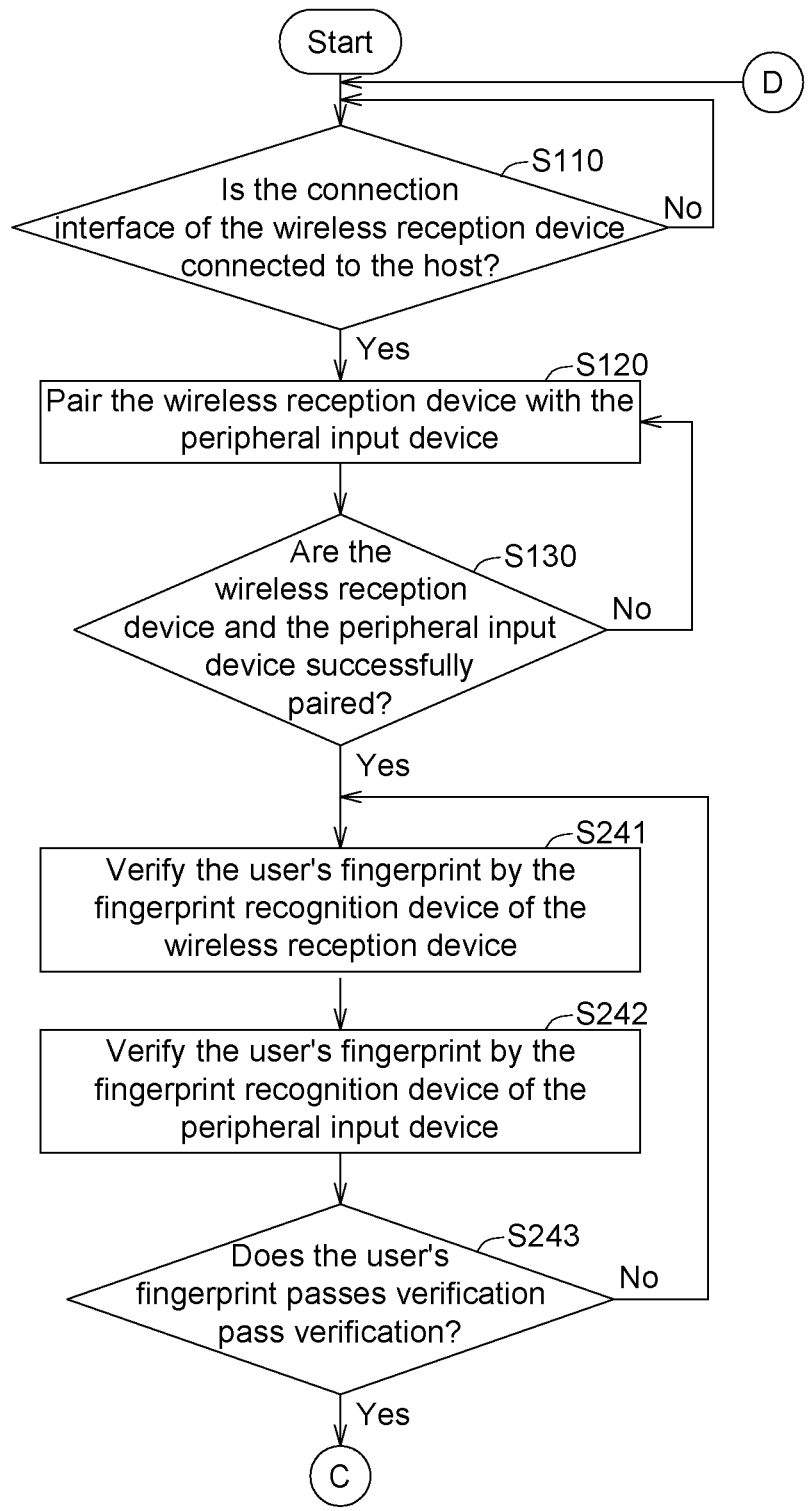
FIGS. 6A to 6B illustrate a flowchart of an operation method of the wireless input component according to another embodiment.
Figure 6B:
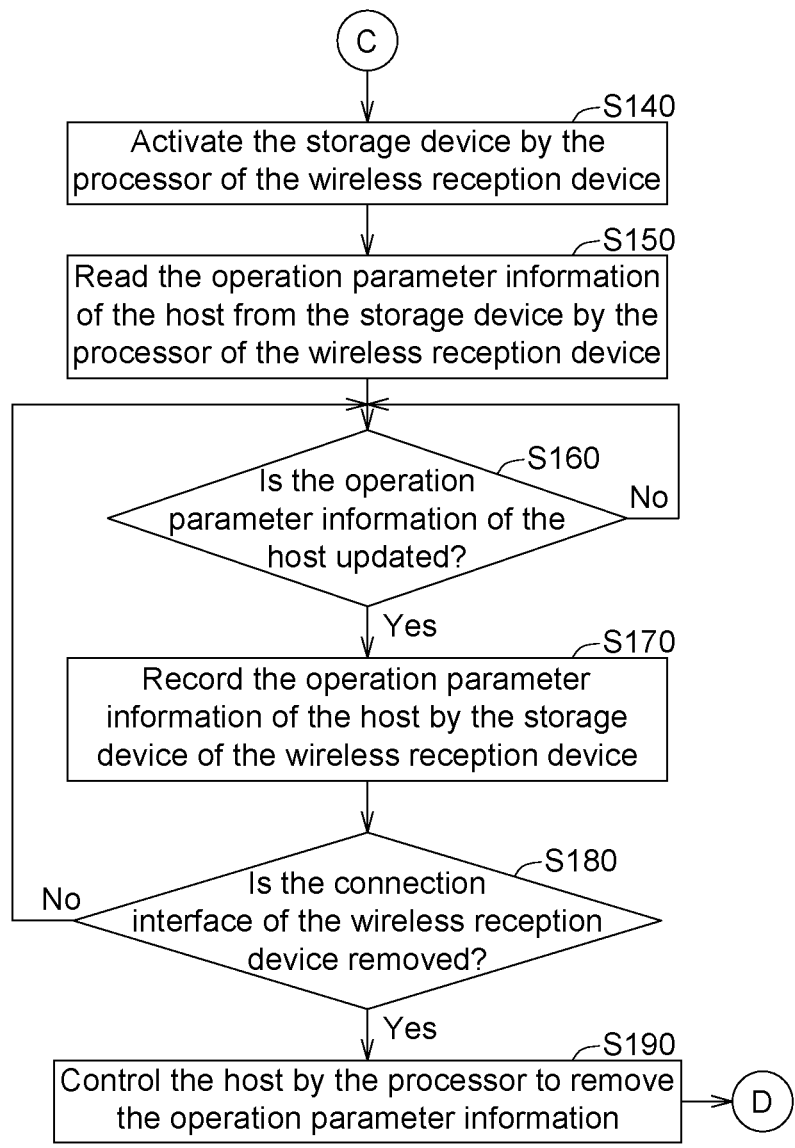

Refer to FIGS. 6A to 6B, which illustrate an operation method of the wireless input component 200 according to another embodiment are shown. In step S130 of the present embodiment, when it is determined that the wireless reception device 110 and the peripheral input device 120 are successfully paired, the method proceeds to step S241.

In step S241, the user's fingerprint is verified by the fingerprint recognition device 215 of the wireless reception device 210.

In step S242, the user's fingerprint is verified by the fingerprint recognition device 225 of the peripheral input device 220. The order of step S241 and the order of step S242 can be swapped.

In step S243, whether the user's fingerprint passes verification passes verification is determined by the fingerprint recognition device 215 and the fingerprint recognition device 225. If the fingerprint passes verification, then the method proceeds to step S140; if the fingerprint does not pass verification, then the method returns to step S241.

In step S140, the storage device 112 is activated by the processor 113. That is, the user's fingerprint needs to be verified in both the wireless reception device 210 and the peripheral input device 220, and only after the user's fingerprint passes verification, the user's identity is confirmed and then the storage device 112 is able to be activated for using the operation parameter information PM.

Figure 7:
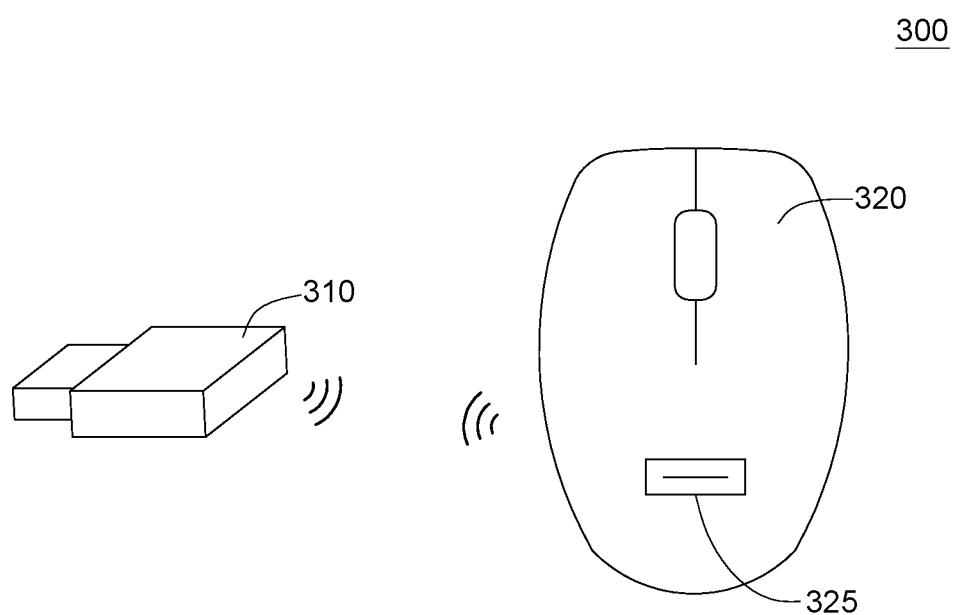
FIG. 7 is a schematic diagram of a wireless input component according to another embodiment.
Figure 8:
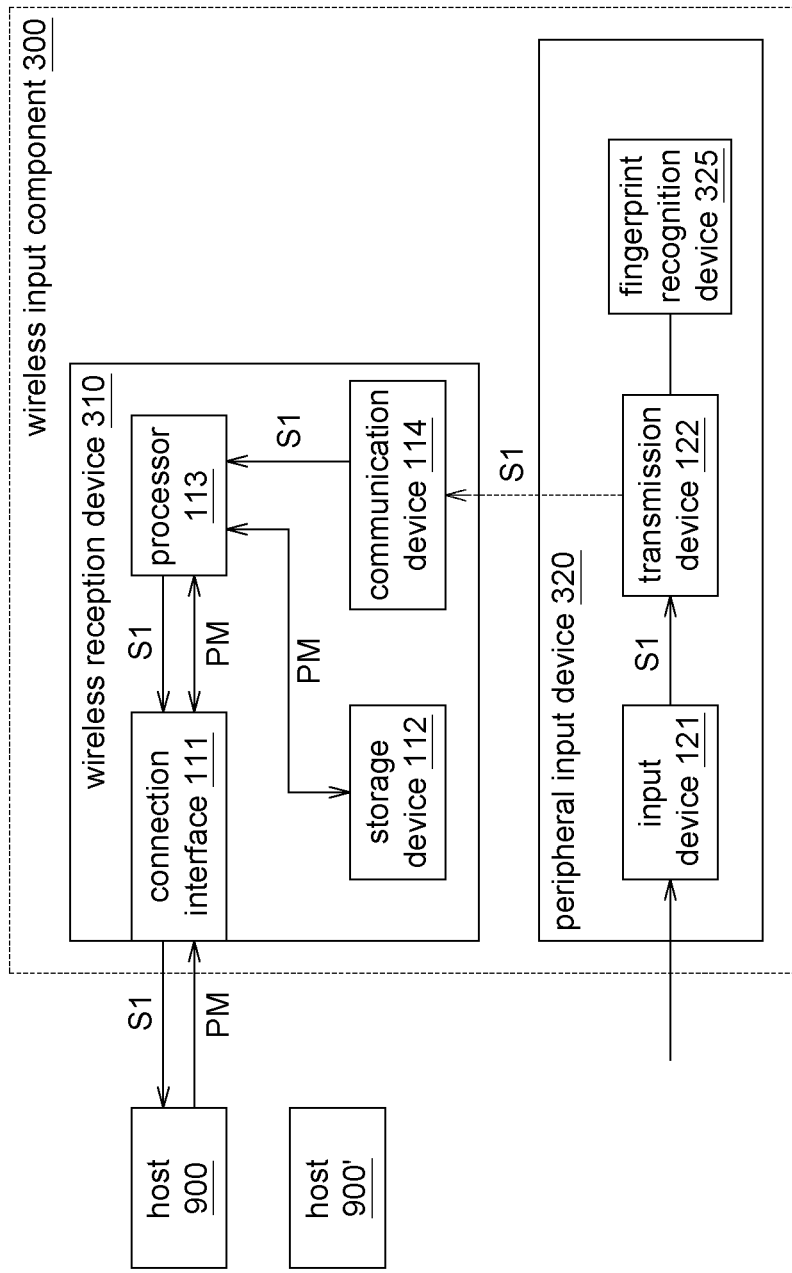
FIG. 8 is a block diagram of the wireless input component according to another embodiment.

Refer to FIGS. 7 to 8. FIG. 7 is a schematic diagram of a wireless input component 300 according to another embodiment. FIG. 8 is a block diagram of the wireless input component 300 according to another embodiment. In another embodiment, the peripheral input device 320 further includes a fingerprint recognition device 325. The fingerprint recognition device 325 is connected to the processor 113 through a wireless communication path. The wireless reception device 310 is not provided with a fingerprint recognition device. The fingerprint recognition device 325 is configured to verify a fingerprint of the user. The fingerprint recognition device 325 can reinforce the safety of the wireless input component 300 to avoid any unauthorized person stealing the wireless input component 300 and using the operation parameter information PM.

Figure 9A:
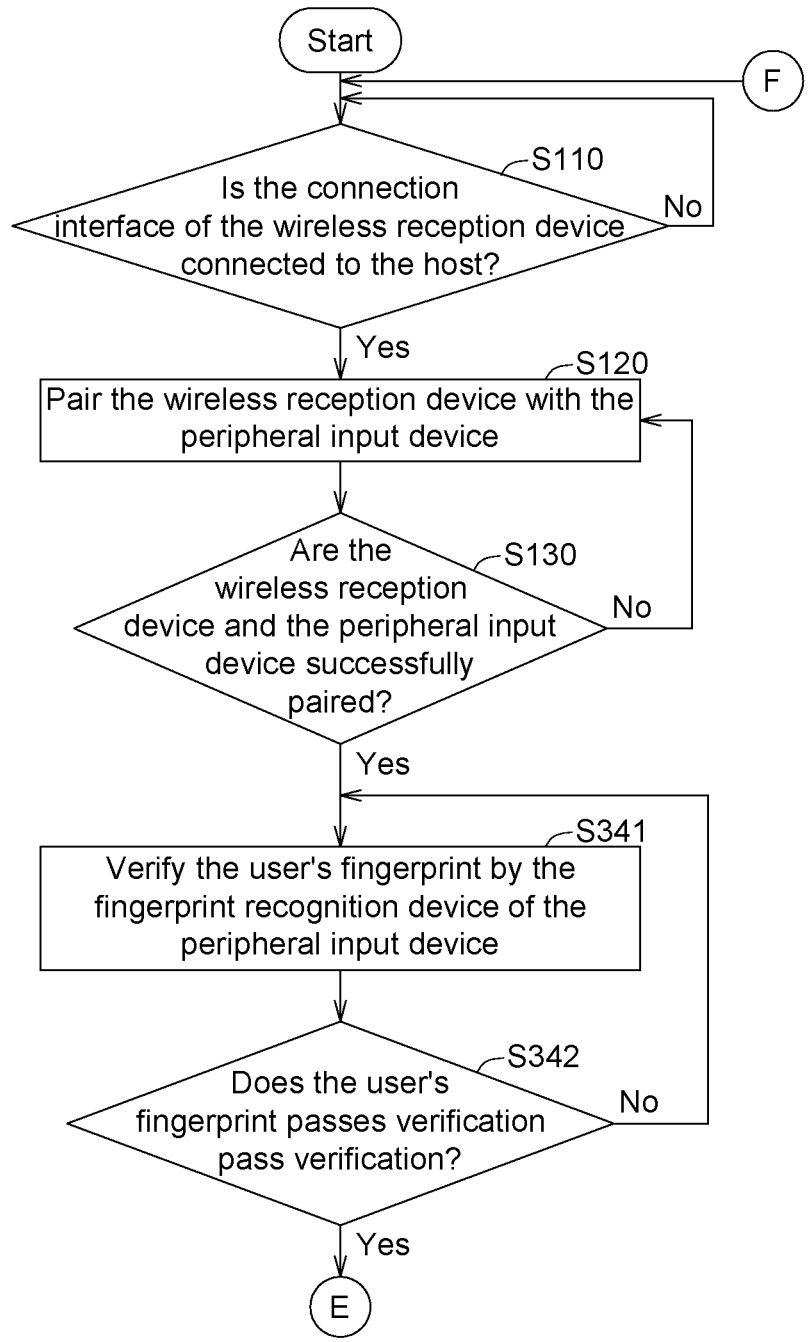
FIGS. 9A to 9B illustrate a flowchart of an operation method of a wireless input component according to another embodiment.
Figure 9B:
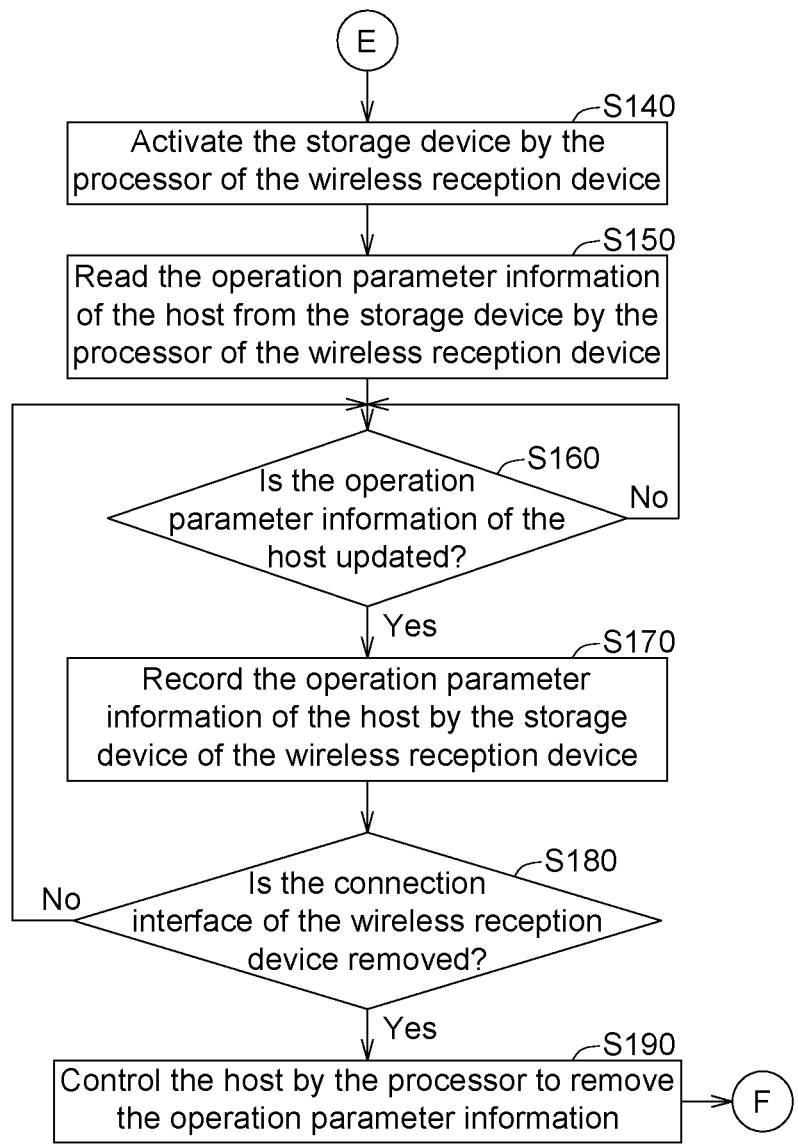

Referring to FIGS. 9A to 9B, a flowchart of an operation method of the wireless input component 300 according to another embodiment is shown. In of the present embodiment step S130, when it is determined that the wireless reception device 310 and the peripheral input device 320 are successfully paired, the method proceeds to step S341.

In step S341, the user's fingerprint is verified by the fingerprint recognition device 325 of the peripheral input device 320.

In step S342, whether the user's fingerprint passes verification is determined by the fingerprint recognition device 325. If the fingerprint the user's fingerprint passes verification, then the method proceeds to step S140; if the fingerprint the user's fingerprint does not pass verification, then the method returns to step S341.

In step S140, the storage device 112 is activated by the processor 113. That is, the user's fingerprint needs to be verified in both the wireless reception device 210 and the peripheral input device 320, and only after the user's fingerprint passes verification, the user's identity is confirmed. Then the storage device 112 is able to be activated for using the operation parameter information PM.

Figure 10:
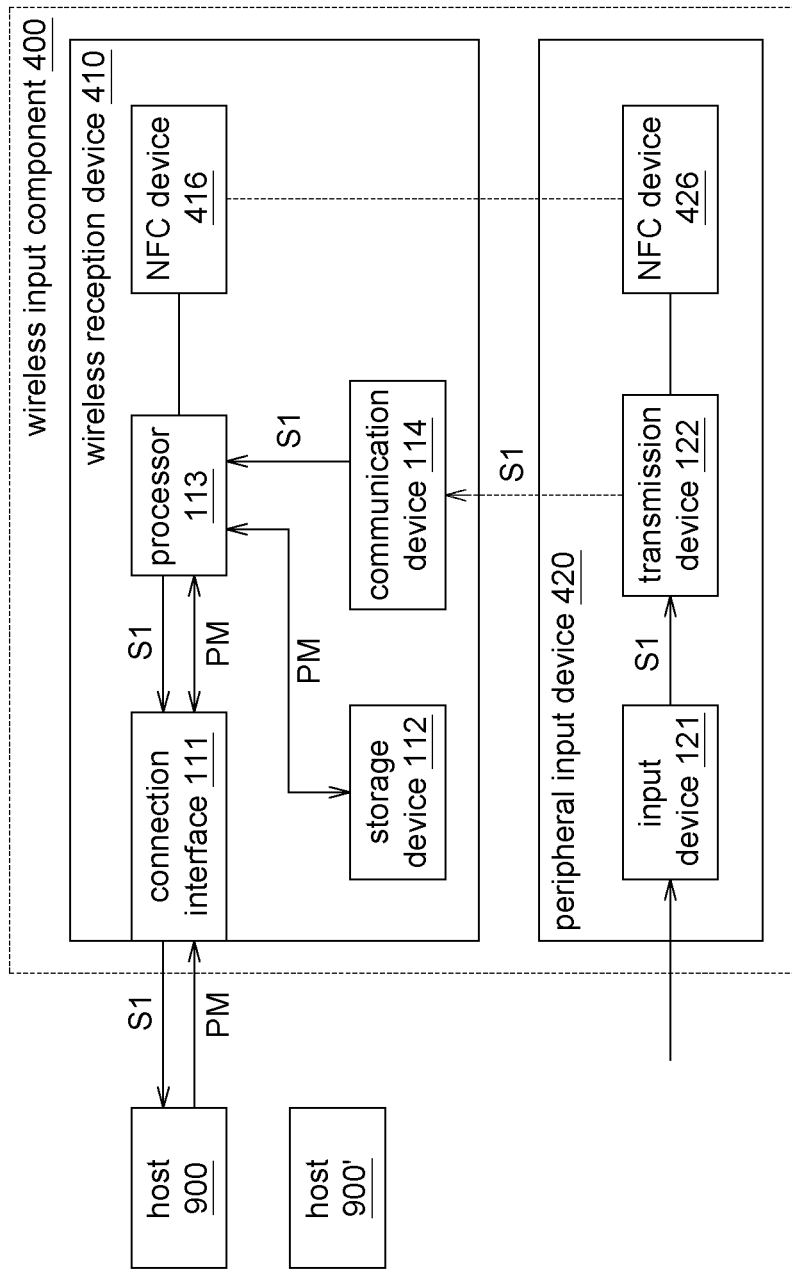
FIG. 10 is a block diagram of a wireless input component according to another embodiment.

Referring to FIG. 10, a block diagram of a wireless input component 400 according to another embodiment is shown. In another embodiment, the wireless reception device 410 further includes a near field communication (NFC) device 416, which connects the processor 113. The peripheral input device 420 further includes an NFC device 426, which connects the transmission device 122. The NFC device 416 and the NFC device 426 are configured to enable the wireless reception device 410 to communicate with the peripheral input device 420 within a few centimeters (cm). The NFC devices 416 and 426 can reinforce the safety of the wireless input component 400 to avoid any unauthorized person stealing the wireless input component 400 and using the operation parameter information PM.

Figure 11A:
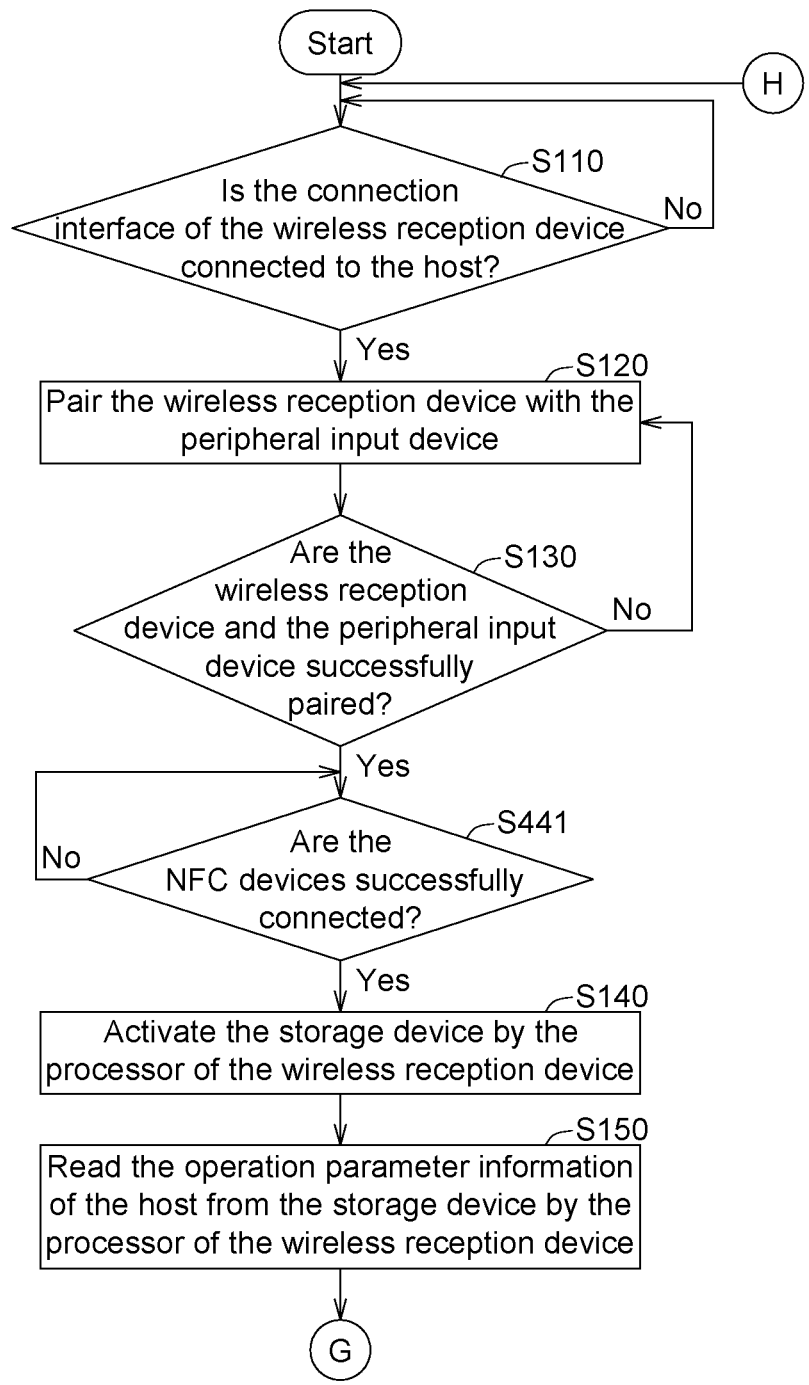
FIGS. 11A to 11B show a flowchart of an operation method of the wireless input component according to another embodiment.
Figure 11B:
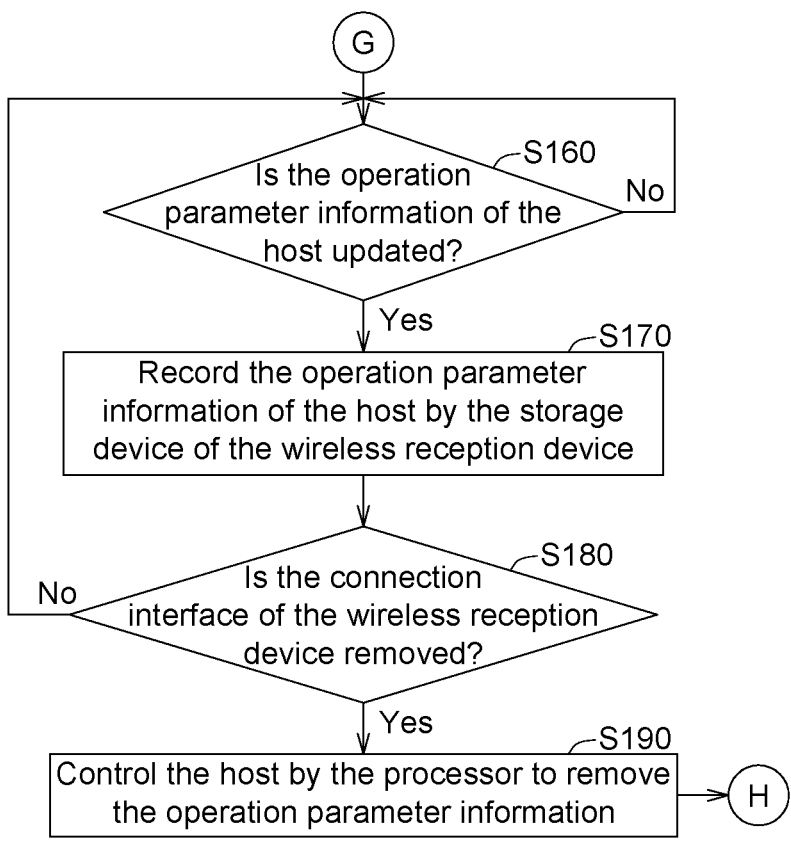

Referring to FIGS. 11A to 11B, a flowchart of an operation method of the wireless input component 400 according to another embodiment is shown. In step S130 of the present embodiment, when it is determined that the wireless reception device 410 and the peripheral input device 420 are successfully paired, the method proceeds to step S441.

In step S441, whether the NFC devices 416 and the NFC device 426 are successfully connected is determined. If the connection is successful, then the method proceeds to step S140; if the connection is not successful, then the method returns to step S441.

In step S140, the storage device 112 is activated by the processor 113. That is, the peripheral input device 420 must be close to the wireless reception device 410 to perform NFC connection to activate the storage device 112 for using the operation parameter information PM.

According to the above embodiments, the operation parameter information PM can be recorded in the wireless reception devices 110, 210, 310 and 410 instead of being stored to the host, such that the wireless reception devices 110, 210, 310 and 410 can be used as authentication. After the user plugs the wireless reception devices 110, 210, 310 and 410 into another host (e.g., the host 900'), the host 900' and the peripheral input device 120, 220, 320 and 420 can be set by the original operation parameter information PM. Furthermore, the wireless reception devices 110, 210, 310 and 410 and the peripheral input devices 120, 220, 320 and 420 can be verified using pairing authentication, fingerprint recognition, or NFC technology to assure the safety of accessing the operation parameter information PM.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless input component, comprising:
 a wireless reception device, comprising:
  a connection interface configured to be connected to a first host;
  a storage device configured to record operation parameter information of the first host;
  a processor coupled to the connection interface and the storage device, wherein the processor is configured to control the storage device; and
  a communication device coupled to the processor; and
 a peripheral input device, comprising:
  an input device configured to generate an input signal; and
  a transmission device coupled to the input device, wherein the transmission device is coupled to the communication device through a wireless communication path and configured to transmit the input signal to the communication device of the wireless reception device.

2. The wireless input component according to claim 1, wherein when the connection interface of the wireless reception device is removed from the first host, the processor removes the operation parameter information from the first host.

3. The wireless input component according to claim 1, wherein the connection interface of the wireless reception device is further configured to connect a second host and input the operation parameter information to the second host.

4. The wireless input component according to claim 1, wherein the operation parameter information comprises a system temperature controlling parameter, a keyswitch setting parameter, a mouse sensitivity parameter, a display setting parameter, a rated voltage, or a rated power.

5. The wireless input component according to claim 1, wherein
 the wireless reception device further comprises a first fingerprint recognition device, coupled to the processor and configured to verify a fingerprint of a user;
 the peripheral input device further comprises a second fingerprint recognition device, coupled to the processor through the wireless communication path and configured to verify the fingerprint of the user; and
 if the fingerprint passes verification, then the processor activates the storage device.

6. The wireless input component according to claim 1, wherein
 the peripheral input device further comprises a fingerprint recognition device, coupled to the processor and configured to verify a fingerprint of a user;
 if the fingerprint passes verification, then the processor activates the storage device.

7. The wireless input component according to claim 1, wherein
 if the wireless reception device and the peripheral input device are successfully paired through a wireless signal or are successfully connected through a wireless communication, then the processor activates the storage device.

8. The wireless input component according to claim 1, wherein
 if the wireless reception device is electrified, then the processor activates the storage device.

9. An operation method of a wireless input component, wherein the wireless input component comprises a wireless reception device and a peripheral input device coupled to the wireless reception device through a wireless communication path, and the operation method comprises:
 pairing the wireless reception device and the peripheral input device if a connection interface of the wireless reception device is connected to a first host;
 controlling a storage device by a processor of the wireless reception device to record operation parameter information of the first host, wherein the processor is coupled to the connection interface; and
 setting the peripheral input device by the processor according to the operation parameter information.

10. The operation method according to claim 9, further comprising:
 recording the operation parameter information of the first host by the storage device if the processor determines that the operation parameter information of the first host is updated; and
 removing the operation parameter information from the first host by the processor if the connection interface of the wireless reception device is removed from the first host.

11. The operation method according to claim 9, further comprising:
 inputting the operation parameter information to a second host by the processor if the wirelessly received connection interface is connected to the second host; and
 setting the second host and the peripheral input device according to the operation parameter information.

12. The operation method according to claim 9, further comprising:
 verifying a fingerprint of a user by a first fingerprint recognition device of the wireless reception device, wherein the first fingerprint recognition device is coupled to the processor;
 verifying the fingerprint of the user by a second fingerprint recognition device of the peripheral input device, wherein the second fingerprint recognition device is coupled to the processor through the wireless communication path; and
 activating the storage device by the processor if the fingerprint passes verification.

13. The operation method according to claim 9, further comprising:
 verifying a fingerprint of a user by a fingerprint recognition device of the peripheral input device, wherein the fingerprint recognition device of the peripheral input device is coupled to the processor through the wireless communication path;

activating the storage device by the processor if the fingerprint passes verification.

14. The operation method according to claim 9, further comprising:
activating the storage device by the processor if the wireless reception device and the peripheral input device are successfully paired through a wireless signal or are successfully connected through a wireless communication.

15. The operation method according to claim 9, further comprising:
activating the storage device by the processor if the wireless reception device is electrified.

* * * * *